United States Patent [19]

Ito

[11] 4,109,405
[45] Aug. 29, 1978

[54] CAPSULE LAMP AS A FISHING TACKLE

[76] Inventor: Kiyomatsu Ito, No. 15-15, 1-chome, Chuo, Edogawa-ku, Tokyo, Japan

[21] Appl. No.: 793,374

[22] Filed: May 3, 1977

[30] Foreign Application Priority Data

May 19, 1976 [JP] Japan .............................. 51-6383[U]
Oct. 21, 1976 [JP] Japan ........................... 51-140643[U]

[51] Int. Cl.² ...................... A01K 93/00; A01K 75/02; F21V 33/00
[52] U.S. Cl. .................................. 43/17.5; 9/8.3 E; 200/81 R; 200/81.9 R; 200/83 J; 200/83 N; 362/158; 362/802
[58] Field of Search ...................... 240/6.4 F, 10.6 R; 200/83 J, 83 N, 81 R, 81.9 R; 9/8.3 E; 43/17.5, 17.6; 362/158, 802

[56] References Cited

U.S. PATENT DOCUMENTS

| | | | |
|---|---|---|---|
| 2,552,224 | 5/1951 | Setterblade | 240/6.4 F |
| 2,744,977 | 5/1956 | Lombard et al. | 200/83 J |
| 3,516,279 | 6/1970 | Maziarka | 200/83 J |
| 3,559,224 | 2/1971 | Shimizu | 240/10.6 R |
| 3,657,501 | 4/1972 | Hoyt | 200/83 J |
| 3,898,405 | 8/1975 | Weber | 200/83 J |

FOREIGN PATENT DOCUMENTS

| | | | |
|---|---|---|---|
| 2,122,566 | 11/1972 | Fed. Rep. of Germany | 200/83 J |
| 317,658 | 1/1957 | Switzerland | 200/83 J |
| 1,203,413 | 8/1970 | United Kingdom | 200/83 J |

Primary Examiner—Benjamin R. Padgett
Assistant Examiner—T. S. Gron
Attorney, Agent, or Firm—Haseltine, Lake, & Waters

[57] ABSTRACT

A capsule lamp as a fishing tackle in which an electric circuit connecting a light bulb and a battery across a switching mechanism is opened or closed in response to water pressure acting on a diaphragm adapted to be deformed by the water pressure into pressing engagement with the switching mechanism.

12 Claims, 7 Drawing Figures

CAPSULE LAMP AS A FISHING TACKLE

FIELD OF THE INVENTION

The present invention relates to fishing tackles and more particularly to a capsule lamp for use as a fishing tackle to be rigged to a fishing line spliced to a bait hook or lure. The fishing tackle herein proposed is operable either for the purpose of aiding an angler to visually trace the path of the bait hook or lure being cast into the water or as a fish-gathering lamp to allure fishes therearound when submerged into water.

SUMMARY OF THE INVENTION

In accordance with the present invention, there is provided a capsule lamp which comprises a hollow casing structure having a light-passing section and formed with at least one opening; an electric light bulb replaceably positioned within the casing structure for being capable of passing light through the light-passing section of the casing structure when the light bulb is energized, the light bulb having two terminal elements; power source means replaceably positioned within the casing structure and having first and second electrodes, the first electrode of the power source means being in contact with one of the terminal elements of the light bulb; an electrically conductive element which is partly in contact with the other of the terminal elements of the light bulb and which has an end portion located at a predetermined spacing from the second electrode of the power source means; an electric contact element positioned within the casing structure and movable between a first position in contact with the end portion of the conductive element and a second position disengaged from the end portion of the conductive element; electrically conductive biasing means seated between the second electrode of the power source means and the contact element and urging the contact element toward one of the first and second positions thereof; and an elastic diaphragm which is detachably fitted to the casing structure and having an inner face engageable with the contact element and an outer face exposed to the outside of the casing structure through the opening or openings in the casing structure, the diaphragm being deformable into pressing engagement with the contact element for moving the contact element into the other of the first and second positions thereof in response to a fluid pressure acting on the outer face of the diaphragm and higher than an atmospheric pressure. The end portion of the conductive element may be located so that the contact element is urged toward the first position thereof by the biasing means and is moved into the second position thereof when the diaphragm is brought into pressing engagement with the contact element. The capsule lamp thus arranged is normally held alight and is switched off when the lamp is cast into the water and as a consequence a water pressure acts on the outer face of the diaphragm. As an alternative, the end portion of the conductive element may be located so that the contact element is urged toward the second position thereof by the aforesaid biasing means and is moved into the first position thereof when the diaphragm is brought into pressing engagement with the contact element. The capsule lamp of this nature is normally put out and is switched in when the lamp is cast into the water and as a consequence water pressure acts on the outer face of the diaphragm. The former type of capsule lamp according to the present invention is adapted for use in helping an angler visually locate the bait hook or lure initially put into the water and the latter type of capsule lamp according to the present invention is useful as a fish-gathering lamp.

More specifically, a capsule lamp according to the present invention comprises a casing structure consisting of a tubular body having longitudinal first and second end portions and an end wall portion opposite to the first end portion and formed with an aperture, a hollow, light-passing closure element detachably connected to the first end portion of the tubular body, and a hollow end fitting detachably connected to the second end portion and formed with at least one opening, the end fitting forming a first open space externally of the end wall portion of the tubular body; an electric light bulb positioned at least in part within the closure element and detachably fitted to the tubular body, the light bulb having first and second terminal elements; a dry cell battery positioned within the tubular body and having a first electrode conductively in contact with the first terminal element of the light bulb and a second electrode located at a predetermined spacing from the inner face of the end wall portion of the tubular body and forming a second open space between the inner face of the end wall portion and the second electrode of the dry cell battery; an electrically conductive element having a first end portion partly in contact with the second terminal element of the light bulb and a second end portion located at least in part within said second open space; an electric contact element having an inner portion located within the second open space and an outer end portion projecting out of the tubular body into the first open space through the aperture in the end wall portion of the tubular body, the contact element being movable between a first position having the inner portion thereof in contact with the second end portion of the conductive element and a second position having the inner portion thereof disengaged from the second end portion of the conductive element; electrically conductive biasing means positioned within said second open space and seated between the second electrode of the dry cell battery and the inner portion of the contact element for urging the contact element toward one of the first and second positions thereof; and an elastic diaphragm positioned within the first open space and detachably fitted along its outer peripheral end to the tubular body and the end fitting for dividing the first open space into an inner variable-volume chamber enclosing the outer end portion of the contact element and an outer variable-volume chamber hermetically isolated from the inner variable-volume chamber and open to the outside of the casing structure through the opening or openings in the end fitting, the diaphragm having an elasticity urging the diaphragm away from the outer end portion of the contact element and being deformable into pressing engagement with the contact element for moving the contact element into the other of the first and second positions thereof in response to a fluid pressure developed in the outer variable-volume chamber and higher than an atmospheric chamber. The second end portion of the conductive element may be attached to the inner face of the end wall portion of the tubular body so that the contact element assumes the first position thereof when located closest to the inner face of the end wall portion of the tubular body, wherein the biasing means is operative to urge the contact element toward the inner face of the end wall portion, viz., toward the first position of the contact element. As an alternative, the second end portion of the conductive element may be located at a predetermined spacing from the inner face of the end wall portion of the tubular body so that the contact element assumes the first position thereof when spaced apart from the inner face of the end wall portion of the tubular body, wherein the biasing means is operable to urge the contact element toward the inner face of the end wall portion of the tubular body, viz., toward the second position of the contact element.

BRIEF DESCRIPTION OF THE DRAWINGS

The features and advantages of a capsule lamp according to the present invention will be understood more clearly from the following description in which like reference numerals designate corresponding or similar elements, portions and spaces and in which:

FIGS. 1 and 2 are longitudinal sectional views depicting a first preferred embodiment of the capsule lamp according to the present invention, wherein FIG. 1 shows the condition in which the capsule lamp is maintained alight in the air and FIG. 2 shows the condition in which the capsule lamp is switched off in water;

FIGS. 3 and 4 are longitudinal sectional views depicting a second preferred embodiment of the capsule lamp according to the present invention, wherein FIG. 3 shows the condition in which the capsule lamp is put out in the air and FIG. 4 shows the condition in which the capsule lamp is maintained alight in water.

DETAILED DESCRIPTION

Figure 1:
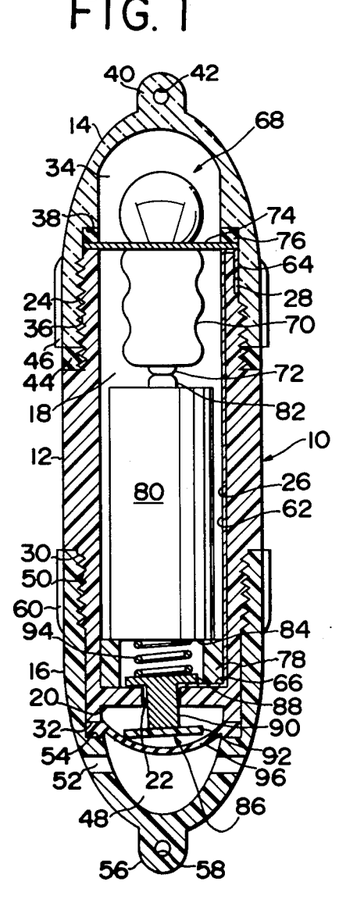
Figure 2:
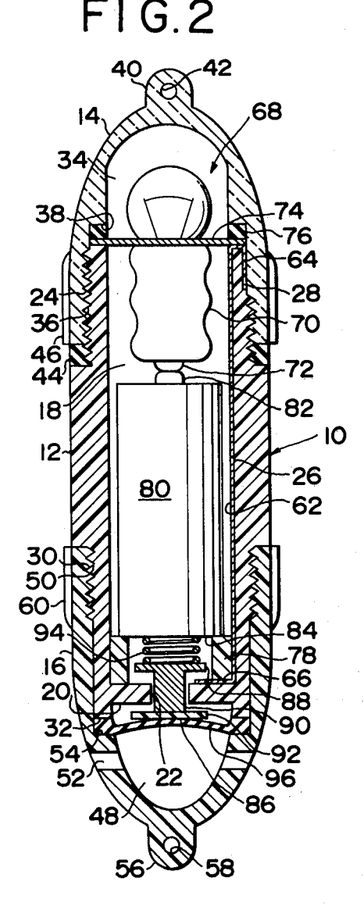

In FIGS. 1 and 2 of the drawings, the present invention is shown embodied in a capsule lamp of the nature which is normally kept alight and is automatically switched off when put in water. The embodiment herein shown is, thus, adapted for use as means to enable an angler to visually discern the location at which the fishing hook or lure cast far into the water together with the capsule lamp is initially submerged into water.

Referring to FIGS. 1 and 2, the capsule lamp of such a nature is designated in its entirety by reference numeral 10 and comprises an elongated, generally torpedo-shaped casing structure consisting of a tubular body 12, a hollow, light-passing closure element 14 constructed of a rigid, transparent or translucent plastic, and a hollow end fitting 16. The closure element 14 and the end fitting 16 may be formed of any rigid, electrically non-conductive materials such as plastics which are opaque, transparent or translucent. The tubular body 12 has an axial bore 18 and is formed with an annular end wall portion 20 forming an aperture 22 through which the axial bore 18 is open at one end thereof. The tubular body 12 has an externally threaded longitudinal end portion 24 terminating at one axial end of the tubular body and has formed in its inner wall a longitudinal groove 26 extending between the opposite ends of the inner wall of the body 12. The longitudinal groove 26 merges into a notch formed in an edge of the threaded end portion 24 and the notch in turn merges into an external groove 28 formed in the outer wall of the threaded portion and axially extending a predetermined length from the notch in the edge of the threaded portion 24. The tubular body 12 further has an externally threaded longitudinal portion 30 close to the other axial end of the body. The annular end wall portion 20 of the tubular body 12 is slightly sunk axially inwardly from the extreme end of the body adjacent to the end wall portion 20 so that the tubular body 12 has a longitudinal end portion 32 slightly projecting axially outwardly beyond the end wall portion 20, as shown.

The closure element 14 has a generally bell-shaped configuration and is formed with a concavity 34 which preferably has a cross section substantially similar in shape and area to the cross section of the axial bore 18 in the tubular body 12. The closure element further has a cylindrical, internally threaded longitudinal portion 36 which terminates at the bellmouthed inner axial end of the element and which is fitted to the externally threaded longitudinal end portion 24 of the tubular body 12. The closure element 14 has a radially stepped inner wall portion adjacent to the internal thread on the internally threaded longitudinal portion 36 and is formed with an annular internal face 38 which is slightly spaced apart axially outwardly from the internal thread on the portion 36. The closure element 14 thus detachably connected to the tubular body 12 has a tapered end portion which merges axially outwardly from the cylindrical, internally threaded longitudinal portion 36 and which terminates in a projection 40 which is formed with an eyelet 42. The end of the internally threaded longitudinal portion 36 of the closure element 14 is slightly spaced apart axially outwardly from the inner axial end of the externally threaded longitudinal end portion 24 of the tubular body 12 so that an annular gap encircling the inner axial end portion of the external thread on the end portion 24 is formed therebetween. A ring-shaped sealing element 44 of, for example, rubber is closely fitted in this gap, hermetically sealing the connection between the tubular body 12 and the closure element 14. The above mentioned annular internal face 38 of the closure element 14 is slightly spaced apart axially outwardly from the outer axial end of the externally threaded longitudinal end portion 24 of the tubular body 12 and thus forms an annular gap between the edge of the end portion 24 of the tubular body 12 and the annular internal face 38 of the closure element 14. The end portion 24 of the closure 14 is shown to be further formed with a plurality of spaced parallel ridges 46 on its outer peripheral surface for anti-slip purposes.

The end fitting 16 also has a generally bell-shaped configuration and is formed with a concavity 48. The end fitting 16 further has a cylindrical, internally threaded longitudinal end portion 50 terminating at the bellmouthed end of the fitting 16 and fitted to the externally-threaded longitudinal portion 30 of the tubular body 12. The end fitting 16 being thus detachably connected to the tubular body 12, there is formed adjacent the outer face of the annular end wall 20 of the tubular body 12 an open space which is constituted in part by a portion of the concavity 48 in the end fitting 16 and in part by the space encircled by the inner peripheral surface of the projecting longitudinal end portion 32 of the tubular body 12. The end fitting 16 is further formed with a suitable number of water inlet openings 52 through which the concavity 48 in the end fitting 16 is open to the outside of the fitting. The end fitting has a radially stepped inner wall portion forming an annular internal face 54 which is slightly spaced apart axially outwardly from the edge of the longitudinal end portion 32 of the tubular body 12. The end fitting 16 is tapered toward its outer axial end and merges into a projection 56 formed with an eyelet 58 similarly to the closure element 14. Further similarly to the closure element 14, the end fitting 16 is shown formed with a plurality of spaced parallel ridges 60 for antislip purposes.

A generally elongated, electrically conductive strip 62 has a major longitudinal portion snugly received in the longitudinal groove 26 in the inner wall of the tubular body 12 and extending throughout the length of the groove 26. The conductive strip 62 has one end portion 64 turned back from the major longitudinal portion of the strip and snugly received in the external groove 28 in the outer wall of the externally threaded longitudinal end portion 24 of the tubular body 12, the end portion 64 of the strip 62 being turned back through the notch intervening between the grooves 26 and 28 as will be seen from the drawings. The closure element 14 has a wall portion which is detachably fast on or in pressing engagement with the outer face of the end portion 64 thus received in the external groove 28 in the end portion 24 of the body 12. The other end portion 66 of the conductive strip 62 is substantially perpendicularly bent from the major longitudinal portion of the strip 62 and is closely received on the inner face of the annular end wall portion 20 of the tubular body 12, extending radially of the end wall portion 20 without reaching the inner circumferential end of the wall portion 20 as shown.

An electric light bulb 68 has a base 70 positioned within the axial bore 18 in the tubular body 12 and a glass envelope projecting from the base 70 into the concavity 34 in the closure element 14. The light bulb 68 has one terminal element 72 axially projecting from the axial end of the base 70 opposite to the glass envelope and the other terminal element 74 constituted by an annular flange of an electrically conductive metal. The flange-shaped terminal element 74 is received on the edge at the axial end of the tubular body 12 adjacent to the annular face 38 of the closure element 14 and is thus electrically conductively in contact with the outer face of that portion of the above described conductive strip 62 which is received in the notch joining the grooves 26 and 28 in the tubular body 12. A ring-shaped retainer element 76 of an elastic, nonconductive material, such as rubber is closely interposed between the flange-shaped terminal element 74 and the annular internal face 38 of the closure element 14 so that the light bulb 68 is securely but detachably held in position partly within the tubular body 12 and partly within the closure element 14.

Within the axial bore 18 in the tubular body 12 is further positioned a ring-shaped spacer element 78 of a rigid, electrically non-conductive material such as a plastic. The spacer element 78 has one end face received on the inner face of the end wall portion 20 of the tubular body 12 and its outer peripheral surface in close contact with the inner peripheral surface of the tubular body 12. The spacer element 78 is assumed to be formed with a notch in its end wall contacting the inner face of the end wall portion 20 of the tubular body 12 and has the bent end portion 66 of the conductive strip 62 passed through the notch. Such a notch will be dispensable if the end wall portion 20 of the tubular body 12 is formed with a radial groove (not shown) to receive therein the bent end portion 66 of the conductive strip 62.

Within the axial bore 18 in the tubular body 12 is still further mounted a dry cell battery 80 as a d.c. power source for the light bulb 68. The dry cell battery 80 has a positive electrode 82 and a negative electrode 84 as is customary and is held in position between the light bulb 68 and the spacer element 78 so that the positive electrode 82 thereof is held in contact with the terminal element 72 of the light bulb 68 and the negative electrode 84 contacting the inner end face of the spacer element 78 is axially spaced apart from the inner face of the annular end wall portion 20 of the tubular body 12 a distance which is equal to the axial length of the spacer element 78. The axial length of the spacer element 78 is thus selected in consideration of the dimensional relationship among the tubular body 12, light bulb 68 and dry cell battery 80.

The capsule lamp 10 embodying the present invention further comprises a movable contact element 86 having a flange portion 88 and an axial stem portion 90. The flange portion 88 is formed at one end of the stem portion 90, which is fixedly connected at the other end to a rigid, electrically non-conductive disc member 92. The stem portion 90 of the contact element 86 has a cross section smaller than the cross section of the aperture 22 in the end wall portion 20 of the tubular body 12 and is movably passed through the aperture 22, projecting axially out of the aperture 22 into the concavity 48 in the end fitting 16 and having the flange portion 88 positioned inboardly of the end wall portion 20 and within the spacer element 78 and the disc member 92 positioned outboardly of the end wall portion 20 and within the projecting longitudinal end portion 32 of the tubular body 12 as shown. The flange portion 88 of the contact element 86 thus positioned between the inner face of the end wall 20 of the tubular body 12 and the bottom face of the dry cell battery 80 has a cross section larger than the cross section of the aperture 22 in the end wall portion 20 and smaller than the cross section of the axial bore in the spacer element 78 and is axially movable toward and away from the inner face of the end wall portion 20 or, in other words, toward and away from the bent end portion 66 of the conductive strip 62. The stem 90 being smaller in cross-section than the aperture 22 in the end wall portion 20 of the tubular body 12, the contact element 86 is allowed to slightly laterally incline from the center axis of the aperture 22 as seen in FIG. 1. On the other hand, the non-conductive disc member 92 which is positioned outside the end wall portion 20 of the tubular body 12 has a cross section larger than the cross section of the aperture 22 in the end wall portion 20 and smaller than the cross section of the inner peripheral surface of the projecting longitudinal end portion 32 of the tubular body 12 and is axially movable toward and away from the inner face of the end wall portion 20 of the tubular body 12. When the contact element 86 thus mounted on the tubular body 12 is in an axial position having the flange portion 88 positioned closest to the inner face of the end wall portion 20 of the tubular body 12 and accordingly the disc member 92 positioned remotest from the outer face of the end wall portion 20 as illustrated in FIG. 1, the flange portion 88 is partly in contact with the bent end portion 66 of the conductive strip 62. When, conversely, the contact element 86 is in axial position having the flange portion 88 positioned remotest from the inner face of the end wall portion 20 of the tubular body 12 and accordingly the disc member 92 positioned closest to the outer face of the end wall portion 20 as shwon in FIG. 2, the flange portion 88 is axially spaced apart and accordingly disengaged from the bent end portion 66 of the conductive strip 62. Thus, the contact element 86 is movable relative to the tubular body 12 between a first axial position electrically connected to the conductive strip 62 as shown in FIG. 1 and a second axial position electrically disconnected from the conductive strip 62 as shown in FIG. 2. The contact element 86 is urged to move toward the first axial position thereof and electrically connected to the negative electrode 84 of the dry cell battery 80 by suitable electrically conductive biasing means such as a preloaded helical compression spring 94 which is shown seated at one end on the inner end face of the flange portion 88 of the contact element 86 and at the other end on the outer face of the negative electrode 84 of the dry cell battery 80. The spring 94 is formed of an electrically conductive metal and, thus, serves not only as the biasing means but as conductor means maintaining electrical connection between the contact element 86 and the negative electrode 84 of the dry cell battery 80. The non-conductive disc member 92 is preferably formed of a rigid plastic.

Outside the disc member 92 thus mounted on the contact element 86 is positioned a generally circular, elastic diaphragm 96 having a circumferential end portion closely interposed between the annular end face of the projecting longitudinal end portion 32 of the tubular body 12 and the annular internal face 54 of the end fitting 16. The open space constituted in part by the space encircled by the inner peripheral surface of the projecting longitudinal end portion 32 of the tubular body 12 and a portion of the concavity 48 in the end fitting 16 is thus divided by the diaphragm 96 into an inner variable-volume chamber between the inner face of the diaphragm 96 and the outer face of the annular end wall portion 20 of the tubular body 12 and an outer variable-volume chamber which is hermetically isolated from the inner variable-volume chamber by the diaphragm 96 and which is open to the outside of the end fitting 16 through the water inlet openings 52 in the end fitting 16. The diaphragm 96 is positioned in such a manner as to have the disc member 92 on the contact element 86 enclosed within the above mentioned inner variable-volume chamber and is axially deformable toward and away from the outer face of the end wall portion 20 of the tubular body 12 or, in other words, between a first position remotest from the inner face of the end wall portion 20 and disengaged in effect from the disc member 92 as shown in FIG. 1 and a second position closest to the outer face of the end wall portion 20 and in pressing contact with the outer face of the disc member 92 as shown in FIG. 2. The diaphragm 96 is formed of an elastic, preferably electrically non-conductive material such as rubber and is biased toward the first position thereof by virtue of the elasticity of its own.

For use as a fishing accessory at night, the capsule lamp 10 thus constructed is rigged to a fishing line spliced to the capsule lamp through the eyelets 42 and 58 in the closure element 14 and end fitting 16, respectively, of the casing structure of the lamp and to a leader tied to a bait hook or lure in a suitable manner as will be described later. When the capsule lamp 10 thus rigged to the fishing line stays in the air, atmospheric pressure obtains in the above mentioned outer variable-volume chamber within the end fitting 16 so that the diaphragm 96 between the inner and outer variable-volume chambers is allowed to stay in the above mentioned first position thereof disengaged in effect from the disc member 92 on the contact element 86, which is therefore held in the first axial position thereof contacting the bent end portion 66 of the conductive strip 62 as shown in FIG. 1 by the force of the preloaded compression spring 94. The compression spring 94 being formed of an electrically conductive metal and electrically interconnecting the contact element 86 and the negative electrode 84 of the dry cell battery 80, the contact element 86 thus held in the first position thereof provides electrical connection between the conductive strip 62 and the negative electrode 84 of the dry cell battery 80 so that a closed electric circuit is formed through the positive electrode 82 of the dry cell battery 80, the terminal elements 72 and 74 of the light bulb 68, the conductive strip 62, the contact element 86, the spring 94 and the negative electrode 84 of the dry cell battery 80. The light bulb 68 is therefore kept energized from the dry cell battery 80 and is maintained to glow.

When the capsule lamp 10 thus maintained alight is cast far into the water together with other fishing tackles such as, for example, the fishing line, sinker, floater and bait hook or lure, the light emanating from the lamp trails a fleeting luminous train in the dark over the surface of the water until the lamp 10 reaches the surface of the water. When the capsule lamp 10 is then submerged into water together with the bail hook or lure, water is admitted into the concavity 48 in the end fitting 16 of the lamp through the water inlet openings 52 in the end fitting 16, thereby filling the outer variable-volume chamber in the end fitting 16. The pressure of water thus developed in the outer variable-volume chamber in the end fitting 16 acts on the diaphragm 96, which is therefore forced to axially deform toward the outer face of the end wall portion 20 of the tubular body 12 and is brought into pressing contact with the outer face of the disc member 92 on the contact element 86. The contact element 86 in toto is therefore moved from the first axial position thereof against the force of the preloaded compression spring 94 and is disengaged from the bent end portion 66 of the conductive strip 62. When the diaphragm 96 is moved to the second position thereof with the outer variable-volume chamber expanded to the maximum volume thereof by the pressure of the water filling the chamber as illustrated in FIG. 2, the contact element 86 is moved to the second axial position thereof and is electrically disconnected from the conductive strip 62. The electrical connection between the conductive strip 62 and the contact element 86 being thus broken, the light bulb 68 is deenergized and is put out. The angler is in this fashion enabled to visually discern the location at which the capsule lamp 10 cast into the water is initially submerged into water and to exactly known the location at which the fishing hook or lure is initially put the water. After the capsule lamp 10 is thus cast into the water, the contact element 86 is kept disengaged from the bent end portion 66 of the conductive strip 62 by the water pressure established in the outer variable-volume chamber in the end fitting 16. When the capsule lamp 10 is pulled out of the water, the end fitting 16 is drained and an atmospheric pressure is built up in the variable-volume chamber so that the diaphragm 96 is allowed to axially deform back into the first position thereof and allows the contact element 86 to be moved back into the first axial position thereof by the force of the preloaded compression spring 94. The lamp 10 is energized from the dry cell 80 and is turned on for a second time. If a fish is biting at the hook or lure, the lamp thus glowing in the dark above the surface of the water will aid the angler in getting a sight of the fish leaping at the end of the line.

Figure 3:
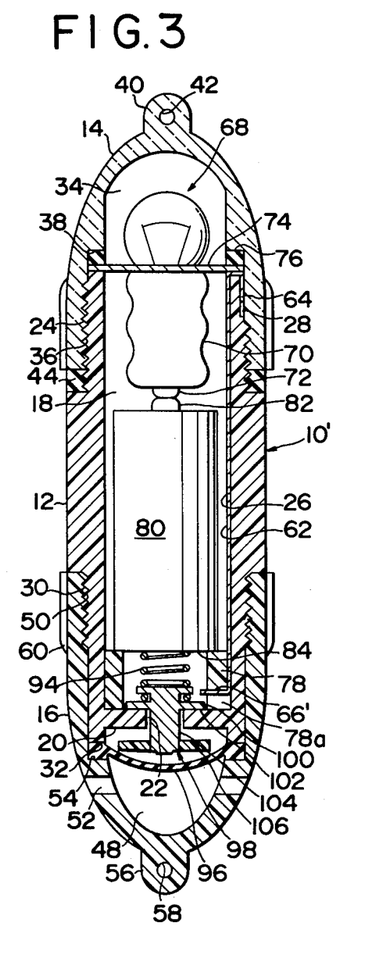
Figure 4:
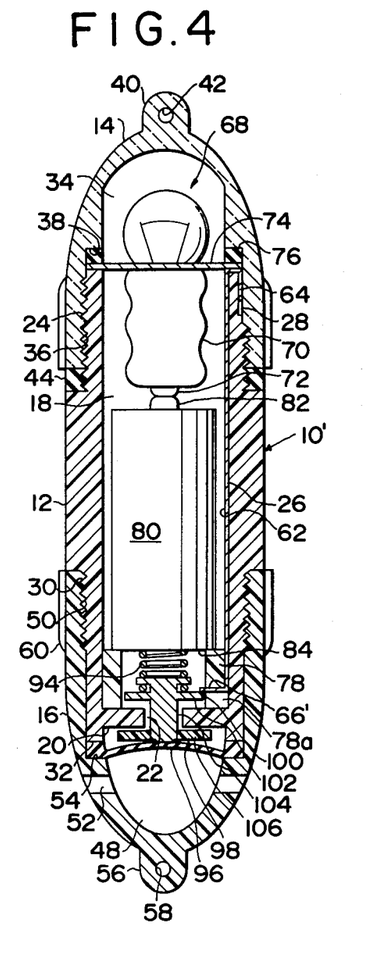

FIGS. 3 and 4 illustrate a second embodiment of the capsule lamp according to the present invention. The capsule lamp herein shown is arranged to be normally put out and to be automatically switched in when the lamp is submerged into water. The capsule lamp, now designated in its entirety by 10', is thus adapted for use as a fish-gathering lamp to allure fishes around the lamp in the water. The capsule lamp 10' is constructed essentially similarly to the embodiment of FIGS. 1 and 2 except for the arrangement in which the light bulb 68 is switched in and off in response to the water admitted into and discharged from the end fitting 16. Thus, the capsule lamp 10' shown in FIGS. 3 and 4 comprises a casing structure which is configured similarly to its counterpart in the embodiment of FIGS. 1 and 2 and which is thus composed of a tubular body 12, a generally bell-shaped closure cap 14 detachably connected to one longitudinal end portion of the tubular body 12 and a generally bell-shaped end fitting 16 detachably connected to the other longitudinal end portion of the tubular body 12. Within the casing structure thus configured are mounted a light bulb 68, a dry cell battery 80 and an elastic diaphragm 96 which are all arranged similarly to their respective counterparts in the embodiment of FIGS. 1 and 2, as will be readily seen from the drawings.

Referring more particularly to FIGS. 3 and 4, the capsule lamp 10' further comprises a generally elongated, electrically conductive strip 62 which has a major longitudinal portion received in the longitudinal groove 26 in the inner wall of the tubular body 12 and one end portion 64 turned back from the major longitudinal portion and received in the external groove 28 formed in the outer wall of the tubular body 12 similarly to the conductive strip 62 in the embodiment of FIGS. 1 and 2. The other end portion, now designated by 66', of the conductive strip 62 in the embodiment of FIGS. 3 and 4 is substantially perpendicularly bent from the major longitudinal portion of the strip 62 at a predetermined distance from the inner face of the annular end wall portion 20 of the tubular body 12 and radially extends over the inner face of the end wall portion 20. The spacer element 78 is thus formed with an axial slot 78a which is open adjacent to the inner face of the end wall portion 20 of the tubular body 12 and which terminates at the above mentioned distance from the inner face of the end wall portion 20, permitting the bent end portion 66' of the conductive strip 62 to extend radially inwardly through the slot 78a. The end portion 66' of the conductive strip 62 terminates short of alignment with the aperture 22 in the end wall portion 20, viz., radially inwardly extends toward the center axis of the bore 18 in the tubular body 12 without reaching extending above the aperture 22, as will be seen from FIGS. 1 and 2. As an alternative to the contact element 86 in the embodiment of FIGS. 1 and 2, the capsule lamp 10' comprises a contact element 98 which consists of spaced parallel inner and flange portions 100 and 102 located inboardly of the end wall portion 20 and within the spacer element 78 and an axial stem portion 104 having a cross section smaller than the cross section of the aperture 22 in the end wall portion 20 and axially movably passed through the aperture 22. The outer flange portion 102 of the contact element 98 is axially movable between the inner face of the end wall portion 20 and the bent end portion 66' of the conductive strip 62 and is so sized as to have a cross section larger than the cross section of the aperture 22 in the end wall portion 20 and smaller than the cross section of the axial bore in the spacer element 78 and to have a circumferential end portion partially overlapping the bent end portion 66' of the conductive strip 62 in the axial direction of the tubular body 12. On the other hand, the inner flange portion 100 of the contact element 98 is so sized as to have a cross section smaller than the cross section of the outer flange portion 102 and to have its outer circumferential end located radially inwardly from the extreme end of the bent end portion 66' of the conductive strip 62. The stem portion 104 projects axially out of the aperture 22 in the end wall portion 20 of the tubular body 12 into the concavity 48 in the end fitting 16 and has fixedly carried at its outer end a rigid, electrically non-conductive disc member 106 which is located outboardly of the end wall portion 20 and which has a cross section larger than the cross section of the aperture 22 in the end wall portion 20 and smaller than the inner peripheral surface of the projecting longitudinal end portion 32 of the tubular body 12. When the contact element 98 thus configured and arranged with the disc member 106 is in an axial position having the outer flange portion 102 seated on the inner face of the end wall portion 20 of the tubular body 12 and the disc member 106 positioned remotest from the outer face of the end wall portion 20, the outer flange portion 102 of the contact element 98 is axially outwardly spaced apart from the bent end portion 66' of the conductive strip 62 and the inner flange portion 100 is radially spaced apart from the end portion 66' of the conductive strip 62 as shown in FIG. 3. Under this condition, the contact element 98 is electrically isolated from the conductive strip 62. When, conversely, the contact element 98 is in an axial position having the outer flange portion 102 partially in contact with the bent end portion 66' of the conductive strip 62 and the disc member 106 positioned closest to the outer face of the end wall portion 20 of the tubular body 12 as shown in FIG. 4, the contact element 98 is electrically connected to the conductive strip 62. The contact element 98 in the embodiment of FIGS. 3 and 4 is, thus, axially movable between a first axial position electrically disconnected from the conductive strip 62 as shown in FIG. 3 and a second axial position electrically connected to the conductive strip 62 as shown in FIG. 4.

The contact element 98 thus arranged in the tubular body 12 is urged to move toward the first axial position thereof by means of a preloaded helical compression spring 94 which has one end portion secured between the inner and outer flange portions 100 and 102 and which is seated at the other end on the bottom face of the dry cell battery 80. The compression spring 94 is formed of an electrically conductive metal and not only serves as biasing means but as conductor means maintaining electrical connection between the contact element 98 and the negative electrode 84 of the dry cell battery 80. The inner flange portion 100 of the contact element 98 serves merely as retaining means for the spring 94 and may therefore be formed of an electrically non-conductive material or may be replaced with any other form of spring retaining means. The non-conductive disc member 106 is preferably formed of a rigid plastic and is engageable with the diaphragm 96 similarly to the disc member 92 on the contact element 86 of the embodiment of FIGS. 1 and 2.

When the capsule lamp 10' thus constructed and arranged stays in the air, atmospheric air obtains in the outer variable-volume chamber within the end fitting 16 so that the diaphragm 96 is allowed to remain in the previously mentioned first position thereof. The diaphragm 96 is therefore disengaged in effect from the disc member 106 on the contact element 98 with the result that the contact element 98 is maintained in the first axial position thereof having the outer flange portion 102 seated on the inner face of the end wall portion 20 of the tubular body 12 by the force of the preloaded compression spring 94. The outer flange portion 102 of the contact element 98 is thus disengaged from the bent end portion 66' of the conductive strip 62 and as a consequence the contact element 98 is electrically disconnected from the conductive strip 62 and maintains the light bulb 68 de-energized.

When the capsule lamp 10' is cast into the water together with other fishing outfits and is submerged into water, the outer variable-volume chamber in the end fitting 16 is filled with water admitted thereinto through the water inlet openings 52 in the end fitting 16. The pressure of water thus developed in the outer variable-volume chamber in the end fitting 16 causes the diaphragm 96 to axially deform toward the second position thereof closest to the outer face of the end wall portion 20 of the tubular body 12 and brings the diaphragm 96 into pressing contact with the disc member 106 on the contact element 98. The contact element 98 is moved from the first axial position to the second axial position thereof against the force of the preloaded compression spring 94 and is brought into contact with the bent end portion 66' of the conductive strip 62. The contact element 98 is now electrically connected to the conductive strip 62 and forms a closed circuit through the dry cell battery 80, light bulb 68, conductive strip 62, contact element 98 and spring 94, causing the bulb 68 to be energized from the dry cell battery 80. The capsule lamp 10' is thus turned on in water and serves as a fish-gathering lamp alluring fishes therearound. When the capsule lamp 10' is pulled out of the water, the end fitting 16 is drained off and as a consequence the diaphragm 96 is allowed to resume the first position thereof so that the contact element 98 is moved back from the second axial position to the first axial position thereof by the force of the compression spring 94, thereby opening up the circuit through the conductive strip 62 and the contact element 98. The capsule lamp 10' is therefore put out for a second time.

Figure 5:
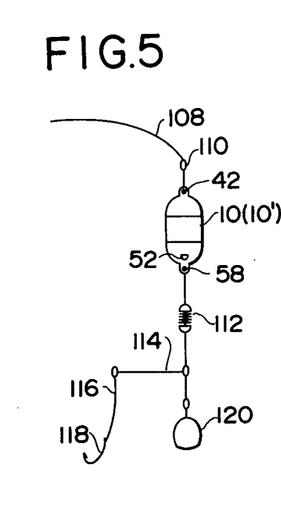
FIGS. 5, 6 and 7 are schematic views showing examples of the tackle arrangement using the capsule lamp having the construction illustrated in FIGS. 1 and 2 or FIGS. 3 and 4.
Figure 6:
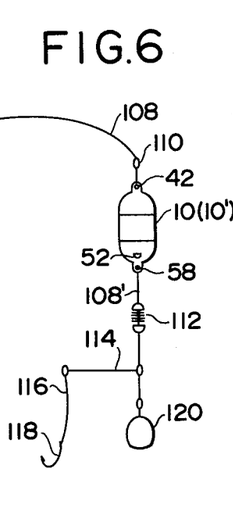
Figure 7:
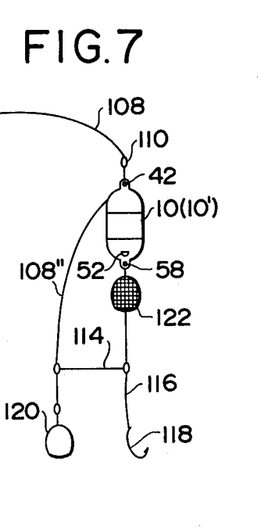

FIGS. 5, 6 and 7 illustrate examples of the arrangement in which the capsule lamp 10 or 10' embodying the present invention is in use with various fishing tackles which per se are well known in the art. In the arrangement shown in FIG. 5, a fishing line 108 leading from a fishing rod (not shown) is tied by means of a snap ring 110 to the capsule lamp 10 or 10' through the eyelet 42 in the closure element of the lamp and is spliced through the eyelet 58 in the end fitting of the lamp to an untwister 112. The untwister 112 in turn is fastened to a spring with outrigger 114 which is connected by a leader 116 to a bait hook 118. A sinker 20 is tied to the knot between the untwister 112 and the spring wire outrigger 114. In FIG. 6, the capsule lamp 10 or 10' provided by the present invention is shown rigged through the eyelet 42 in the closure element of the lamp to a fishing line 108 leading from a rod (not shown) and having a snap ring 110 fitted thereto. The capsule lamp 10 or 10' is further tied through the eyelet 58 in the end fitting of the lamp to a line 108' which is fastened through an untwister 112 to a spring wire outrigger 114 and to a sinker 20, the outrigger 114 being spliced through a leader 116 to a bait hook 118 as in the arrangement shown in FIG. 5. In the arrangement illustrated in FIG. 7, the capsule lamp 10 or 10' according to the present invention is shown used with a line 108'' tied to the capsule lamp through the eyelet 42 in the closure element of the lamp in addition to a line 108 leading from a fishing rod (not shown) and tied by means of a snap ring 110 to the closure element of the lamp through the eyelet 42. The line 108'' thus leading from the eyelet 42 in the capsule lamp 10 or 10' is fastened to a spring wire outrigger 114 and a sinker 120 and the outrigger 106 in turn is spliced through a leader 116 to a bait hook 118. The capsule lamp 10 or 10' further has a chumming bag or bait distributor 122 tied to the lamp through the eyelet 58 in the end fitting of the lamp.

The tackle arrangements herein shown and described are merely by way of example and, thus, the capsule lamp according to the present invention may be used in any desired manner other than those shown in FIGS. 5, 6 and 7.

Major advantages of the capsule lamp according to the present invention are as follows:

(1) The switching actions by the contact element 86 or 98 can be achieved accurately and with certainty by properly selecting the force of the compression spring 94 and the elasticity of the diaphragm 96.

(2) The water-tightness of the casing structure can be secured easily and with certainty by means of the diaphragm 96 which serves not only as a pressure-responsive switch actuating element but as a sealing element between the tubular body 12 and the end fitting 16.

(3) The component parts, particularly the light bulb 68 and the dry cell battery 80 mounted within the casing structure can be readily replaced with new ones because the casing structure can be easily disassembled without disconnecting the closure element 14 and the end fitting 16 from the fishing line or lines tied thereto.

(4) The diaphragm 96 is enclosed within the end fitting 16 and is not directly subjected to external shocks and impacts on the casing structure, assuring a sufficiently long service life of the lamp.

(5) In the embodiment illustrated in FIGS. 3 and 4, in particular, the light bulb 68 is alight only when the capsule lamp stays in water. The dry cell battery 80 can therefore be used for a prolonged period of time without being replaced with new one.

What is claimed is:

1. A capsule lamp as a fishing tackle, comprising a casing structure consisting of a unitary tubular body having longitudinal first and second end portions and an annular end wall portion axially inwardly recessed from the extreme end of the second end portion and formed with an aperture, said body having an internal groove formed in the inner peripheral wall of the body and extending longitudinally between the extreme end of said first end portion and the inner end face of said annular end wall portion and an external groove formed in the outer peripheral wall of the body and extending substantially in parallel with said internal groove a predetermined length from said extreme end, said external groove being joined to said internal groove through a radial notch formed in the edge of said first end portion, a hollow, light-passing closure element in threadedly mating engagement with said first end portion, and a hollow end fitting in threadedly mating engagement with said second end portion and formed with at least one opening, the end fitting forming a first internal space between the end fitting and the outer end face of said end wall portion; an electric light bulb positioned within said casing structure and having a first terminal element axially projecting within said body away from said closure element and a flange-shaped second terminal element having an outer circumferential portion detachably secured to said edge of said first end portion of said body by means of said closure element and thereby holding the bulb in position partially within said body and partially within said closure element; a dry cell battery positioned within said tubular body and having a first electrode in direct contact with the first terminal element of the light bulb and a second electrode located axially at a predetermined spacing from the inner end face of said end wall portion and forming a second internal space between the inner end face of the end wall portion and said second electrode, said second internal space being in communication with said first internal space through said aperture in said end wall portion; a unitary, electrically conductive element consisting of an elongated intermediate portion detachably received in said internal groove, a first end portion turned back from said intermediate portion through said notch and detachably received in said external groove, said first end portion of the conductive element being partly received in said notch and in contact with the second terminal element of the light bulb, said closure element having a wall portion detachably fast on said first end portion of the conductive element, and a second end portion substantially perpendicularly bent from said intermediate portion and located within said second internal space, the second end portion of the conductive element extending radially inwardly from said internal groove and terminating short of alignment with the aperture in said end wall portion; an electric contact element having an axially inner portion located within said second internal space and an axially outer portion axially projecting out of said tubular body into said first internal space through said aperture, said contact element being movable in its entirety between a first position having said inner portion seated on the inner end face of said end wall portion and a second position axially spaced apart from the inner end face of the end wall portion, the contact element being in contact with said second end portion of the conductive element when the contact element is in one of the first and second positions thereof and being electrically disconnected from the second end portion of the conductive element when the contact element is in the other of said first and second positions; electrically conductive biasing means positioned within said second internal space and seated between said second electrode and said inner portion for urging said contact element toward said position in which said inner portion is seated on the inner face of said end wall portion; and an elastic, electrically non-conductive diaphragm positioned within said first internal space and having an outer peripheral end detachably secured between said tubular body and said end fitting for dividing said first internal space into an inner variable-volume chamber enclosing said outer end portion of said contact element and an outer variable-volume chamber hermetically isolated from said inner variable-volume chamber and open to the outside of said casing structure through said opening, the diaphragm having an elasticity urging the diaphragm axially away from said outer end face of said end wall portion and being deformable into pressing contact with said outer portion of said contact element for axially moving the contact element toward said position in which said inner portion is axially spaced apart from the inner end face of said end wall portion as a fluid pressure higher than atmospheric pressure is developed in said outer variable-volume chamber through said opening.

2. A capsule lamp as set forth in claim 1, in which said second end portion of said conductive element is attached to the inner end face of said end wall portion of said tubular body so that said contact element is in contact with the second end portion of the conductive element when the conductive element assumes said first position.

3. A capsule lamp as set forth in claim 1, in which said second end portion of said conductive element is located axially at a predetermined spacing from the inner end face of said end wall portion of said tubular body so that said contact element is in contact with the second end portion of the conductive element when the contact element assumes said second position.

4. A capsule lamp as set forth in claim 1, in which said second end portion of said tubular body axially projects outwardly beyond said end wall portion of the tubular body and in which said end fitting is formed with an annular internal face axially spaced apart from the extreme end of said second end portion of said tubular member for forming an annular gap between the extreme end of said second end portion and said annular internal face, said diaphragm having said outer peripheral end closely received in said annular gap.

5. A capsule lamp as set forth in claim 1, in which said inner portion of said contact element is larger in cross section than said aperture in said end wall portion of the tubular body.

6. A capsule lamp as set forth in claim 1, further comprising an electrically non-conductive element fitted to said outer end portion of said contact element and located in said inner variable-volume chamber for being engageable with the inner face of said diaphragm.

7. A capsule lamp as set forth in claim 6, in which said non-conductive element is larger in cross section than said aperture in said end wall portion of the tubular body.

8. A capsule lamp as set forth in claim 1, further comprising an electrically non-conductive spacer element positioned between said second electrode of said dry cell battery and said inner end face of said end wall portion of the tubular body for holding the second electrode axially at a predetermined distance from the inner end face of the end wall portion.

9. A capsule lamp as set forth in claim 1, in which each of said closure element and said end fitting has a tapered end portion.

10. A capsule lamp as set forth in claim 1, in which each of said closure element and said end fitting is formed with an eyelet in its end portion.

11. A capsule lamp as set forth in claim 1, in which each of said tubular body, said closure element and said end fitting is constructed of a rigid, electrically non-conductive material.

12. A capsule lamp as set forth in claim 5, in which said contact element further comprises an intermediate portion joining said inner and outer portions of the contact element and axially extending through said aperture in said end wall portion of said tubular body, said intermediate portion being smaller in cross-section than said aperture so that the contact element as a whole is allowed to laterally incline from the center axis of the tubular body.

* * * * *